Patented Aug. 19, 1930

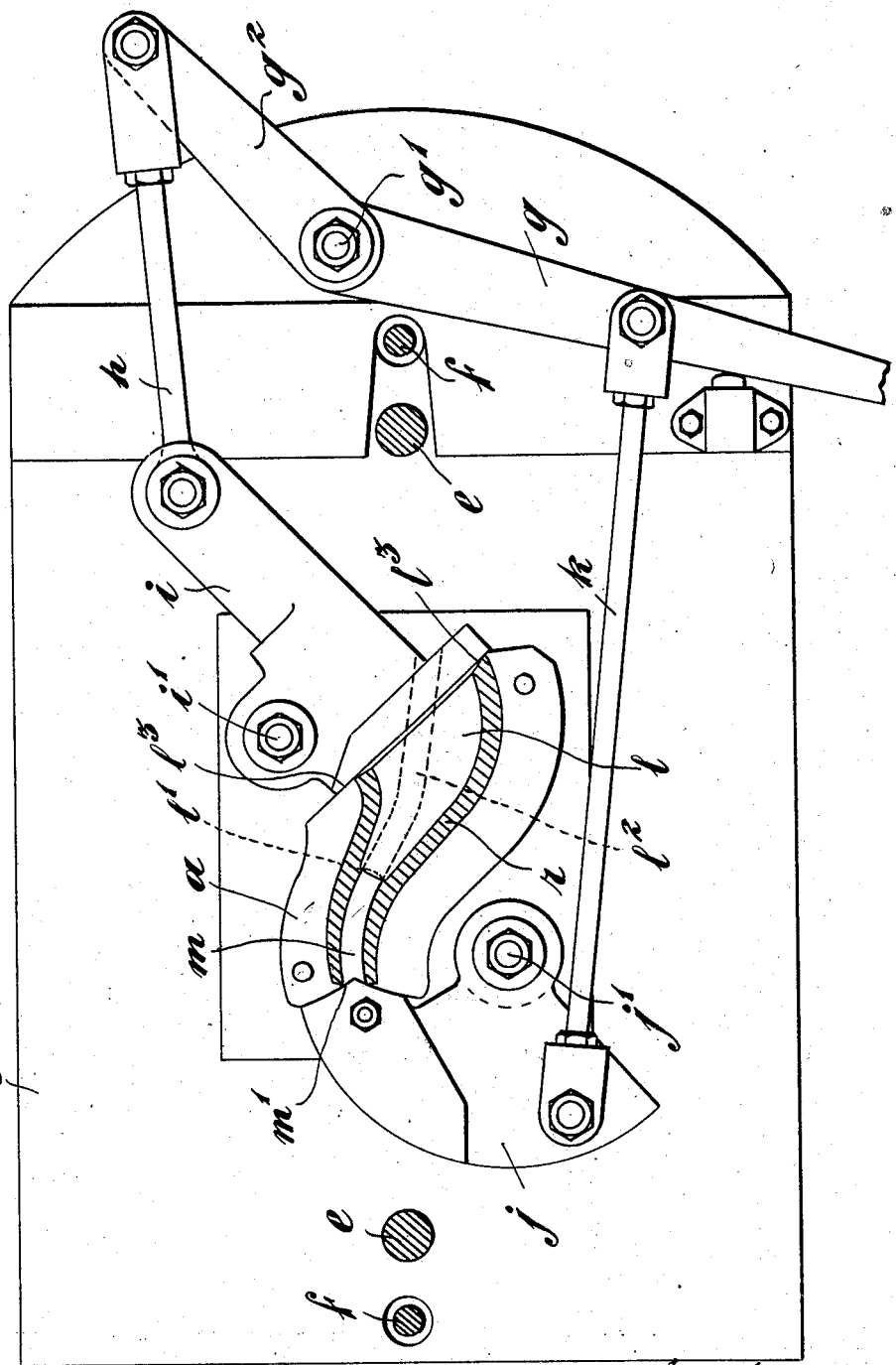

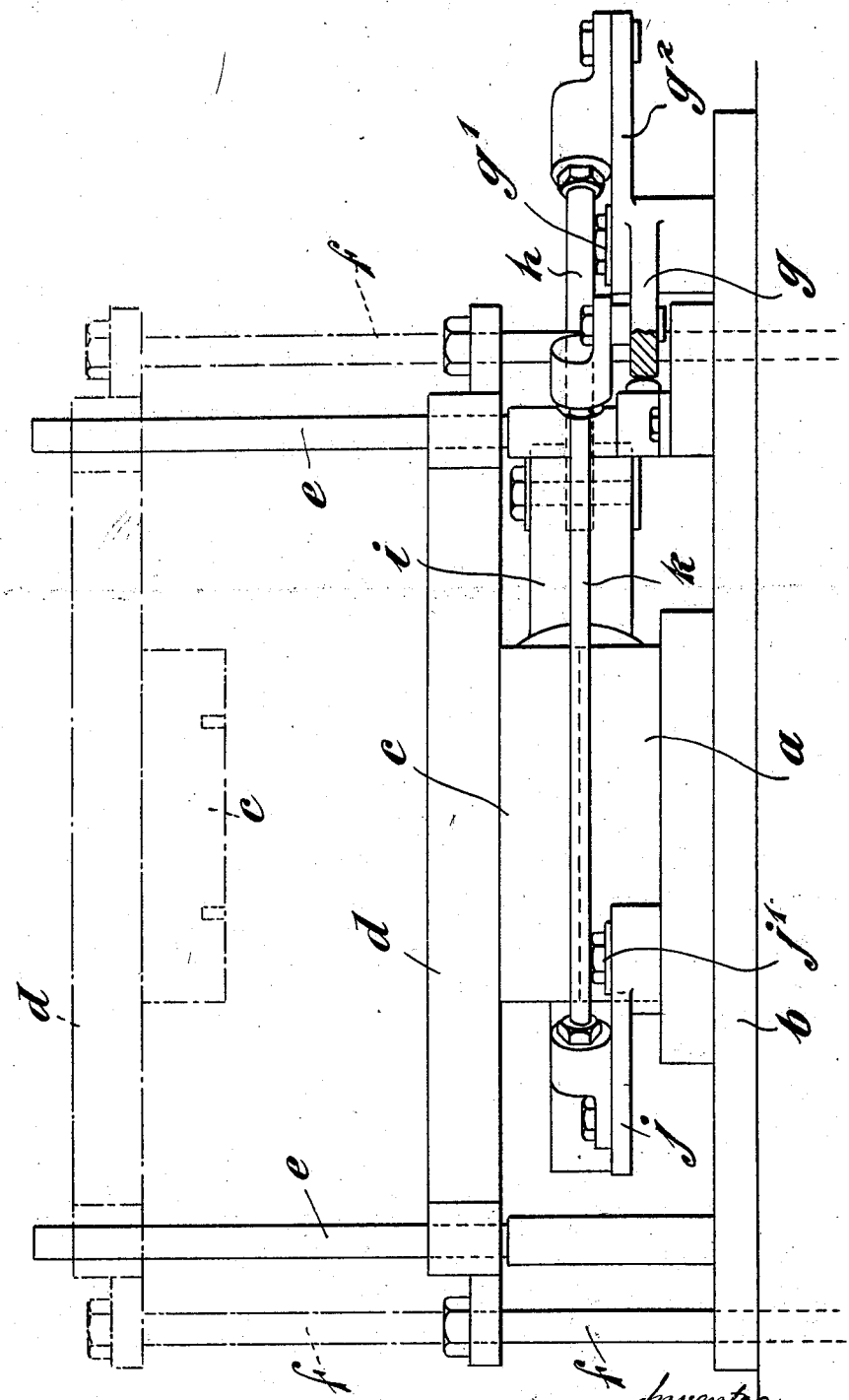

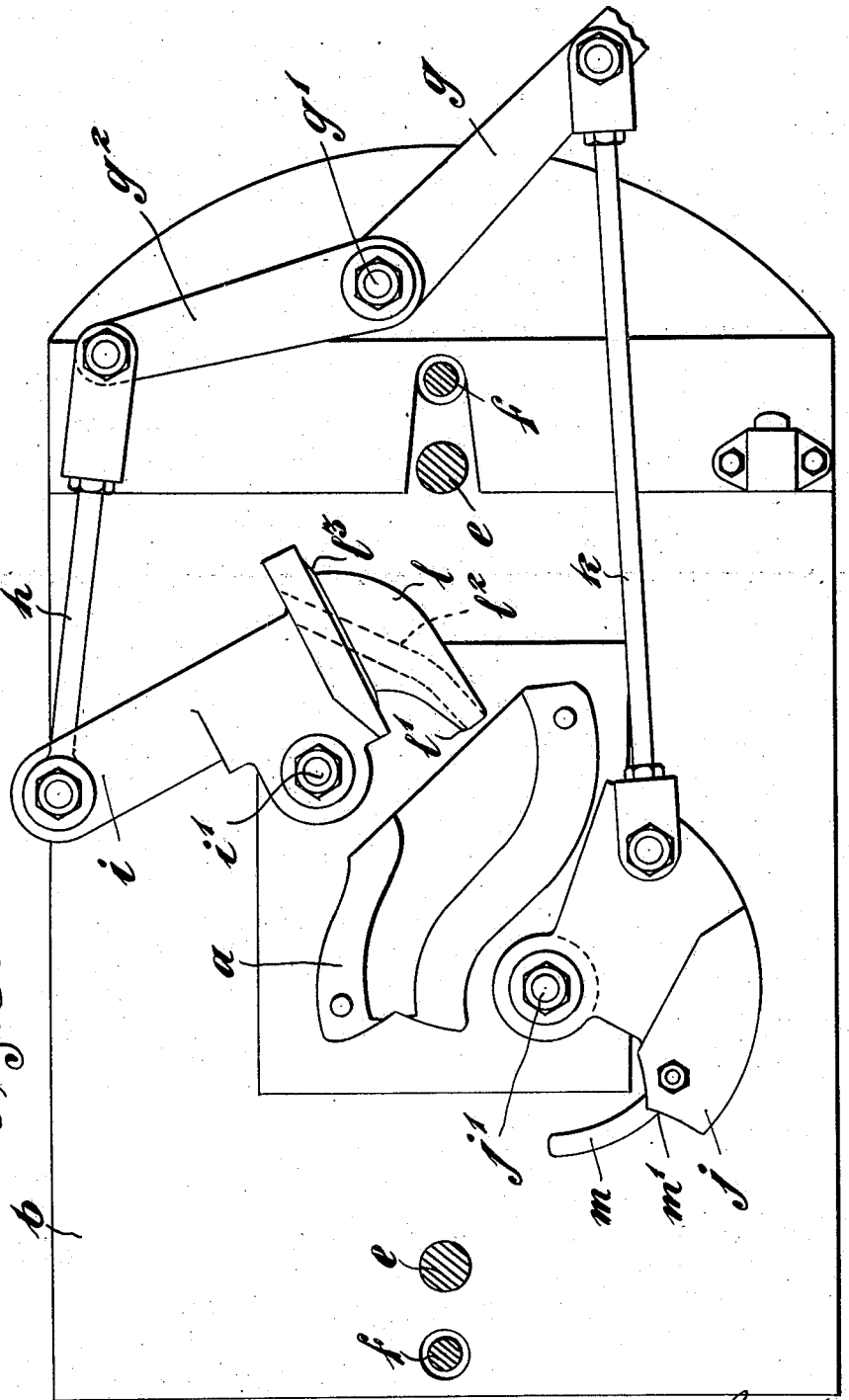

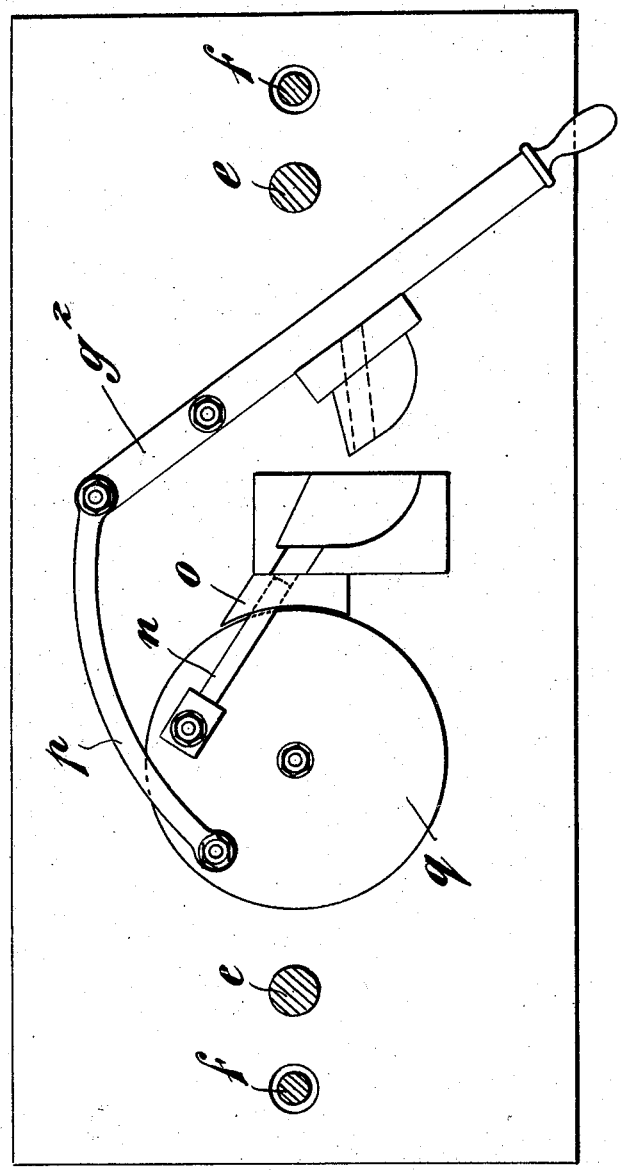

1,773,447

UNITED STATES PATENT OFFICE

WILLIAM COULTER, OF BURSLEM, ENGLAND

PRESS AND/OR PROCESS FOR THE MANUFACTURE OF TEAPOT SPOUTS OR LIKE ARTICLES OF POTTERY

Application filed October 9, 1928, Serial No. 311,268, and in Great Britain February 9, 1928.

My invention has relation to a press and/or process for the manufacture of teapot spouts or like articles of pottery, and has for its object to provide for the particularly expeditious, uniform and generally efficient manufacture of such articles from plastic clay, moistened clay dust or the like.

According to the present invention I provide a press for the manufacture of teapot spouts or like articles of pottery, comprising upper and lower intaglio dies or moulds, adapted to press a plastic clay or like body into a solid spout formation, and lateral coring dies adapted to be thrust into and out of engagement one with another, to core the solid body within the engaging upper and lower dies and render same of the desired hollow tubular formation.

Conveniently the lateral coring dies may have opposed arcuate movements to give the desired sinuous conduit within the solid body, and may be actuated simultaneously by a common hand lever. One coring die may be in the form of an arcuate rod, and the other of bulbous nose formation, to constitute the flared inlet, the adjacent part of which is afterwards engaged with the body of the pot, and each or either coring die may have a bearing face adapted to close the adjacent open extremity of the cavity constituted by the upper and lower dies, for giving a terminal finish to the spout at either or both the pouring and attachment extremities. The upper die may be brought into engagement with the lower die by a pedal mechanism, whereas, as previously intimated, the lateral coring dies may be operated simultaneously by an independent single hand lever. If desired, one lateral coring die may be in the nature of a straight rod so that the outlet portion of the conduit in the spout is of straight formation.

The coring dies are preferably adapted to engage one within the other at their extremities to ensure extrusion of the internal mass, and such extrusion may be facilitated by providing a conduit in one of the lateral die elements through which the superfluous body being moulded may pass or flow.

In order that this invention may be clearly understood and readily carried into practice, reference may be had to the appended explanatory sheet of drawings, upon which:—

Figure 1 is a sectional plan view illustrating a pressing mechanism for the manufacture of a teapot or like spout constructed according to the present invention.

Figure 2 is a front elevational view of the press shown in Figure 1.

Figure 3 is a sectional plan view corresponding to the Figure 1, illustrating the press in the "open" condition.

Figure 4 is a sectional plan view of a pressing mechanism hereinafter referred to, slightly modified.

In a convenient embodiment of the present invention, the lower die $a$ is mounted upon a table $b$ supported by a suitable substructure. The upper die $c$ (Figure 2) is carried by a cross bar $d$ which is slidable upon two uprights $e$ carried by the table $b$, the said cross bars being operated through the medium of rods $f$ which pass through apertures in the table, to a suitably weighted foot pedal mechanism (not shown). Upper and lower dies $c$ and $a$ respectively are in intaglio or relief and of substantially the same configuration, each being adapted to form a half of the spout, that is to say, a half considered when the spout is split longitudinally along its centre plane. Pivoted to the table at $g^1$ is a hand lever $g$ (Fig. 3) and a part $g^2$ of said lever is extended beyond its pivot and is connected by means of a connecting link to a rocking shank $i$ pivoted at $i^1$ to the stationary table $b$. $j$ is a further rocking member pivoted at $j^1$ to the stationary table $b$ and linked to the lever $g$ by means of the rod $k$. The rocking shank $i$ carries the bulbous like coring die $l$ and the rocking member carries the curved rod like coring die which is adapted to enter a small cavity $l^1$ at the extreme end of the die $l$. The die $l$ is further provided with an extrusion outlet $l^2$ and an associate closure or bearing face $l^3$, and the die $m$ is also provided with a closure or bearing face $m^1$, the purpose of these closure or bearing faces being to close or cooperate with the extremities of the mould $a, c$.

In a modification of the present invention, instead of using an arcuate rod-like coring die $m$ I may employ a straight rod-like coring die $n$ (Figure 4) adapted to have an axial sliding movement within a suitable guide $o$, so as to slide between the main dies $a$ $c$ for the purpose of this invention. Such a die $n$ may be connected to the hand lever extension $g^2$ by means of a link $p$ and rotary disc $q$.

In operation, a lump of plastic clay or like body is placed in the cavity in the lower stationary die $e$, and the upper die $c$ is caused to descend by the foot pedal mechanism to virtually constitute a solid teapot spout or a portion thereof. By manipulating the hand lever $g$, the lateral coring dies $l$ $m$ are simultaneously urged into the solid body until the rod-like die $m$ is engaged with the extreme end of its complementary die $l$.

Simultaneously or finally, the ends of the main dies $a$ $c$ are closed or completed by the bearing faces $m^1$ $m^3$ aforeinstanced, and the spout is completed, the superfluous body passing along the conduit $l^2$. The lateral coring dies $l$ $m$ are retracted, and the upper die $c$ elevated, when the spout $r$ may be removed and, if desired, trimmed. The extreme ends of the spout are or may be defined by the bearing faces associated with the opposed coring dies in co-operation with corresponding faces associated with the upper and lower dies. Alternatively, stationary faces may be provided for defining the extreme ends of the spout, through which stationary faces the coring dies may be caused to protrude in the operation of the apparatus. The upper and lower main dies may have flutings, to give a desired enhanced appearance to the lower bulbous part of the spout.

What I claim as my invention and desire to secure by Letters Patent is:

1. A press for the manufacture of teapot spouts or like articles of pottery, comprising upper and lower intaglio dies or moulds adapted to press a plastic clay or like body into a solid spout formation, and lateral coring dies adapted to be thrust into and out of engagement one with another, to core the solid body within the engaging upper and lower dies and render same of the desired hollow tubular formation.

2. The mode of manufacturing a teapot spout or like article of pottery, consisting in first pressing a plastic or like body causing it to assume the shape of a spout and then simultaneously piercing the same from each end while holding the plastic body in the pressed condition.

3. A press for the manufacture of teapot spouts or like articles of pottery, comprising dies or moulds in intaglio adapted to be brought together to constitute a hollow mould the extremities of which are open, and two opposed coring dies one adjacent each open extremity of the mould and adapted to be shot into the said mould into engagement with one another.

4. A press for the manufacture of teapot spouts or like articles of pottery, as claimed in the last preceding claim, wherein faces are associated with the coring dies adapted to close the open extremities of the mould for shaping the extreme ends of the article and/or abut against the extremities of the said mould for stop limiting purposes.

5. A press for the manufacture of teapot spouts or like articles of pottery, comprising upper and lower intaglio dies, adapted to form a complete mould, coring dies adapted to be introduced from the extremities of the complete mould and a passage or outlet adapted to permit of extrusion of the superfluous body during the moulding operation.

6. A press for the manufacture of teapot spouts or like articles of pottery, as claimed in claim 3, wherein one coring die is in the form of a bulbous nose and the complementary coring die is in the form of a rod, the extreme end of which is adapted to be accommodated in a small cavity in the tip of the bulbous nose.

7. A press for the manufacture of teapot spouts or like articles of pottery, as claimed in claim 3, wherein each coring die is adapted to have an arcuate movement on a fixed pivot, and wherein the rod like die is of bent or curved formation.

8. A press for the manufacture of teapot spouts or like articles of pottery, as claimed in claim 3, wherein a conduit is provided through one of the coring dies, through which the superfluous body being moulded is adapted to flow.

9. A press for the manufacture of teapot spouts or like articles of pottery, comprising intaglio dies adapted to be brought into engagement, a foot pedal mechanism for operating said dies, coring dies, and an independent handle mechanism for synchronously operating said coring dies.

10. A press for the manufacture of teapot spouts or like articles of pottery, as claimed in claim 3, wherein one of said coring dies is of straight rod-like shape and has an axially sliding mounting for the purpose set forth.

In witness whereof I have hereunto set my hand.

WILLIAM COULTER.